United States Patent
Liu et al.

(10) Patent No.: US 9,842,282 B2
(45) Date of Patent: Dec. 12, 2017

(54) METHOD AND APPARATUS FOR CLASSIFYING OBJECTS AND CLUTTER REMOVAL OF SOME THREE-DIMENSIONAL IMAGES OF THE OBJECTS IN A PRESENTATION

(71) Applicant: HERE Global B.V., Veldhoven (NL)

(72) Inventors: Xiaoqing Liu, Pleasanton, CA (US); Jeffrey Adachi, El Cerrito, CA (US); Antonio Haro, Hercules, CA (US); Jane MacFarlane, Oakland, CA (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/719,523

(22) Filed: May 22, 2015

(65) Prior Publication Data

US 2016/0342862 A1 Nov. 24, 2016

(51) Int. Cl.
*G06K 9/66* (2006.01)
*G06K 9/62* (2006.01)
(Continued)

(52) U.S. Cl.
CPC .............. *G06K 9/6267* (2013.01); *G06K 9/46* (2013.01); *G06K 9/468* (2013.01); *G06T 15/04* (2013.01);
(Continued)

(58) Field of Classification Search
CPC ............ G06K 9/00208; G06K 9/00288; G06T 15/205; G06T 2200/08; G06T 2207/30221; G06T 5/005; G06T 7/20
(Continued)

(56) References Cited

U.S. PATENT DOCUMENTS 7,397,970 B2 7/2008 Han et al.
8,081,799 B2 12/2011 Wiedemann et al.
(Continued)

OTHER PUBLICATIONS

Kluckner et al., "Image-Based Building Classification and 3D Modeling with Super-pixels", Jun. 2010, 6 Pages.
(Continued)

*Primary Examiner* — Manuchehr Rahmjoo
(74) *Attorney, Agent, or Firm* — Ditthavong & Steiner, P.C.

(57) ABSTRACT

An approach is provided for classifying objects that are present at a geo-location and providing an uncluttered presentation of images of some of the objects in an application such as a map application. The approach includes determining one or more regions of interest associated with at least one geo-location, wherein the one or more regions of interest are at least one textured three-dimensional representation of one or more objects that may be present at the at least one geo-location. The approach also includes processing and/or facilitating a processing of the at least one textured three-dimensional representation to determine at least one two-dimensional footprint and three-dimensional geometry information for the one or more objects. The approach further includes causing, at least in part, a generation of at least one two-dimensional image representation of the one or more regions of interest by causing, at least in part, a projection of three-dimensional texture information of the at least one textured three-dimensional representation onto the at least one two-dimensional footprint. The approach also includes causing, at least in part, a classification of the one or more objects based, at least in part, on the at least one two-dimensional image representation and the three-dimensional geometry information.

20 Claims, 15 Drawing Sheets

(51) Int. Cl.
 *G06K 9/46* (2006.01)
 *G06T 15/04* (2011.01)
 *G06T 15/10* (2011.01)
 *G06T 17/05* (2011.01)

(52) U.S. Cl.
 CPC .............. *G06T 15/10* (2013.01); *G06T 17/05* (2013.01); *G06K 2009/4666* (2013.01)

(58) Field of Classification Search
 USPC ........................................................ 382/195
 See application file for complete search history.

(56) References Cited

U.S. PATENT DOCUMENTS

| | | |
|---|---|---|
| 8,582,808 B2 | 11/2013 | McLaughlin et al. |
| 9,327,406 B1* | 5/2016 | Hinterstoisser ........ B25J 9/1697 |
| 2012/0148162 A1* | 6/2012 | Zhang ................... G06T 7/0081 |
| | | 382/195 |
| 2013/0002670 A1* | 1/2013 | Kikuta .................... G06T 15/04 |
| | | 345/420 |
| 2014/0368507 A1* | 12/2014 | Altman ................... G06T 17/05 |
| | | 345/426 |
| 2015/0030255 A1 | 1/2015 | Wu et al. |

OTHER PUBLICATIONS

Ghaffarian et al., "Automatic Building Detection Based on Supervised Classification Using High Resolution Google Earth Images", ISPRS Technical Commission III Symposium, Sep. 5, 2014, 6 Pages.

Zhou et al., "Building detection from urban SAR image using building characteristics and contextual information", EURASIP Journal on Advances in Signal Processing, Mar. 20, 2013, 16 Pages.

Arefi, "Building Extraction Using Surface Model Classification", Jan. 21, 2013, 11 Pages.

* cited by examiner

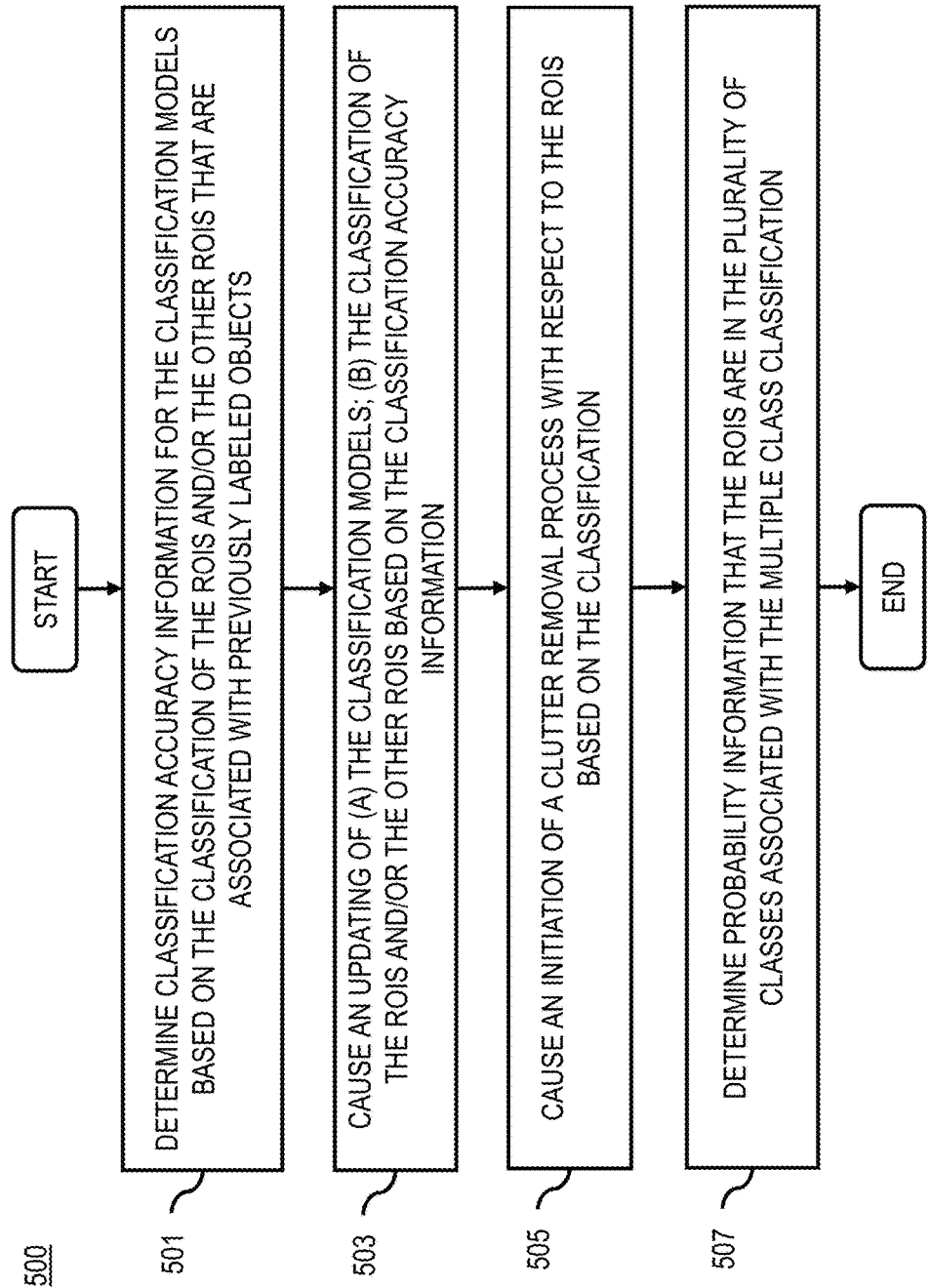

| Feature Description | No. | Feature Description | No. |
|---|---|---|---|
| Geometry | 6 | Color | 12 |
| G1- Orientation | 1 | C1- Intensity: mean & std | 2 |
| G2- Shape: ratio of MajorAxis/MinorAxis | 1 | C2- Greenness: mean & std | 2 |
| G3- Eccentricity | 1 | C3- Brightness-Greenness: mean & std | 2 |
| G4- Area | 1 | C4- RGB value: mean & std | 2 |
| G5- Height | 1 | C5- HSV value: mean & std | 2 |
| G6- Volume | 1 | C6- YUV value: mean & std | 2 |
| Structure | 3 | Color Histogram | 9 |
| S1- Furniture: is included in neighbor | 1 | CH1- RGB | 3 |
| S2- Neighbor: has close neighbors | 1 | CH2- HSV | 3 |
| S3- Distance: to nearest neighbor | 1 | CH3- YUV | 3 |
| Edge Density | 4 | Edge Orientation | 4 |
| ED1- Compass Filters: Mean | 4 | EO1- Compass Filters: Orientation | 4 |

| Class | TP Rate | FP Rate | Precision | Recall | ROC Area |
|---|---|---|---|---|---|
| Building | 0.938 | 0.131 | 0.932 | 0.938 | 0.968 |
| Non-Building | 0.869 | 0.063 | 0.88 | 0.869 | 0.968 |
| Overall Accuracy | | | 91.39% | | |

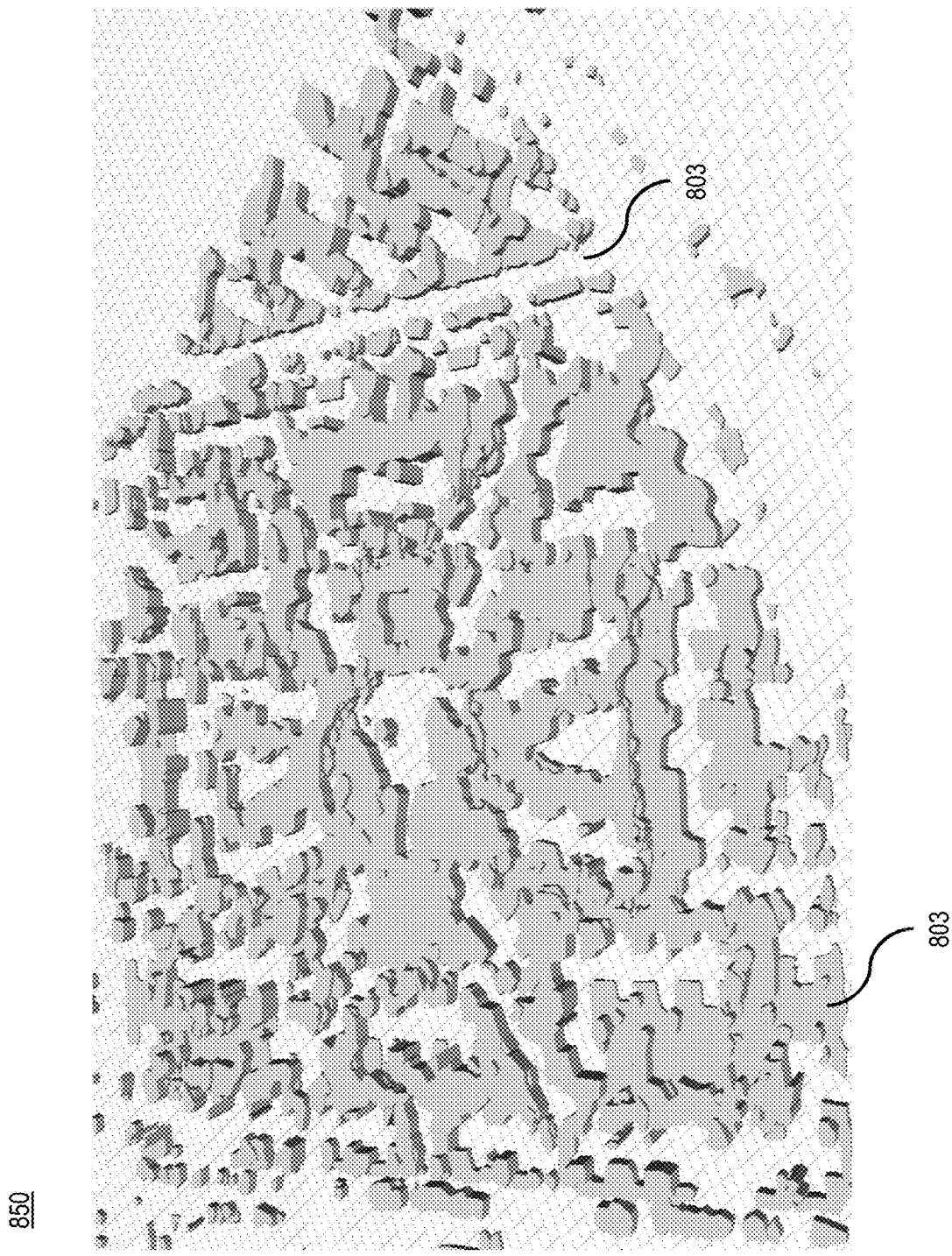

METHOD AND APPARATUS FOR CLASSIFYING OBJECTS AND CLUTTER REMOVAL OF SOME THREE-DIMENSIONAL IMAGES OF THE OBJECTS IN A PRESENTATION

BACKGROUND

Service providers and device manufacturers (e.g., wireless, cellular, etc.) are continually challenged to deliver value and convenience to consumers by, for example, providing location information via various applications at a user device such as a mobile phone, navigation system, a personal digital assistant, laptops, etc. In an application such as digital map of a geo-location, three-dimensional (3D) building models may be a useful or an important feature in providing location-based information or services. Additionally, textured 3D models of objects (e.g., buildings, other structures, cars, trees, etc.) at a certain geo-location (e.g., a city, at a point of interest (POI)) may enable presentation of user-friendly and accurate images of the objects in a map application, which may be used for identifying or locating navigation paths or POIs on the map. Depending on a geo-location that is presented in a map application, the presentation may be cluttered and densely populated with images of a variety of objects (e.g., trees, cars, boats, etc.) that may be unnecessary for inclusion in the presentation. Some service providers (e.g., application developers, mapping data processors, etc.) may be able to unclutter or reduce the clutter in a presentation of images of objects in a map application by removing some of the images of certain objects (e.g., trees and cars) from the presentation. However, a 3D surface model of a geo-location may include a group of 3D models that may correspond to a plurality of respective objects; therefore, making identification of the objects and uncluttering of a presentation of the images of the objects potentially time consuming, inaccurate, or inefficient. As a result, service providers face significant technical challenges in accurate classification of objects that may be present at a geo-location and providing a user-friendly presentation of images of the objects in applications such as a map application.

SOME EXAMPLE EMBODIMENTS

Therefore, there is a need for an approach for classifying objects that are present at a geo-location and providing an uncluttered presentation of images of some of the objects in an application such as a map application.

According to one embodiment, a method comprises determining one or more regions of interest associated with at least one geo-location, wherein the one or more regions of interest are at least one textured three-dimensional representation of one or more objects present at the at least one geo-location. The method also comprises processing and/or facilitating a processing of the at least one textured three-dimensional representation to determine at least one two-dimensional footprint and three-dimensional geometry information for the one or more objects. The method further comprises causing, at least in part, a generation of at least one two-dimensional image representation of the one or more regions of interest by causing, at least in part, a projection of three-dimensional texture information of the at least one textured three-dimensional representation onto the at least one two-dimensional footprint. The method also comprises causing, at least in part, a classification of the one or more objects based, at least in part, on the at least one two-dimensional image representation and the three-dimensional geometry information.

According to another embodiment, an apparatus comprises at least one processor, and at least one memory including computer program code for one or more computer programs, the at least one memory and the computer program code configured to, with the at least one processor, cause, at least in part, the apparatus to determine one or more regions of interest associated with at least one geo-location, wherein the one or more regions of interest are at least one textured three-dimensional representation of one or more objects present at the at least one geo-location. The apparatus is also caused to process and/or facilitate a processing of the at least one textured three-dimensional representation to determine at least one two-dimensional footprint and three-dimensional geometry information for the one or more objects. The apparatus is further caused to cause, at least in part, a generation of at least one two-dimensional image representation of the one or more regions of interest by causing, at least in part, a projection of three-dimensional texture information of the at least one textured three-dimensional representation onto the at least one two-dimensional footprint. The apparatus is also caused to cause, at least in part, a classification of the one or more objects based, at least in part, on the at least one two-dimensional image representation and the three-dimensional geometry information.

According to another embodiment, a computer-readable storage medium carries one or more sequences of one or more instructions which, when executed by one or more processors, cause, at least in part, an apparatus to determine one or more regions of interest associated with at least one geo-location, wherein the one or more regions of interest are at least one textured three-dimensional representation of one or more objects present at the at least one geo-location. The apparatus is also caused to process and/or facilitate a processing of the at least one textured three-dimensional representation to determine at least one two-dimensional footprint and three-dimensional geometry information for the one or more objects. The apparatus is further caused to cause, at least in part, a generation of at least one two-dimensional image representation of the one or more regions of interest by causing, at least in part, a projection of three-dimensional texture information of the at least one textured three-dimensional representation onto the at least one two-dimensional footprint. The apparatus is also caused to cause, at least in part, a classification of the one or more objects based, at least in part, on the at least one two-dimensional image representation and the three-dimensional geometry information.

According to another embodiment, an apparatus comprises means for determining one or more regions of interest associated with at least one geo-location, wherein the one or more regions of interest are at least one textured three-dimensional representation of one or more objects present at the at least one geo-location. The apparatus also comprises means for processing and/or facilitating a processing of the at least one textured three-dimensional representation to determine at least one two-dimensional footprint and three-dimensional geometry information for the one or more objects. The apparatus further comprises means for causing, at least in part, a generation of at least one two-dimensional image representation of the one or more regions of interest by causing, at least in part, a projection of three-dimensional texture information of the at least one textured three-dimensional representation onto the at least one two-dimensional footprint. The apparatus also comprises means for causing, at least in part, a classification of the one or more objects based, at least in part, on the at least one two-dimensional image representation and the three-dimensional geometry information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3 through 5 are flowcharts of various processes for, at least, classifying objects that are present at a geo-location and providing an uncluttered presentation of images of some of the objects in an application such as a map application, according to various embodiments;

FIG. 6A illustrates a list of example features that may be utilized to classify an object, according to one embodiment;

FIG. 6B illustrates a list of example statistical information associated with classification of objects, according to an embodiment;

FIGS. 8A through 8C illustrate presentation of objects at an example geo-location based on classifications of the objects, according to various embodiments;

DESCRIPTION OF SOME EMBODIMENTS

Examples of a method, apparatus, and computer program for classifying objects that are present at a geo-location and providing an uncluttered presentation of images of some of the objects in an application such as a map application, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to classifying objects that are present at a geo-location and providing an uncluttered presentation of images of some of the objects in an application such as a map application, it is contemplated that the approach described herein may be applicable to any invention that can be modelled according the example processes described below and can benefit from classifying objects that are present at a geo-location and providing an uncluttered presentation of images of some of the objects in an application such as a map application.

Figure 1:
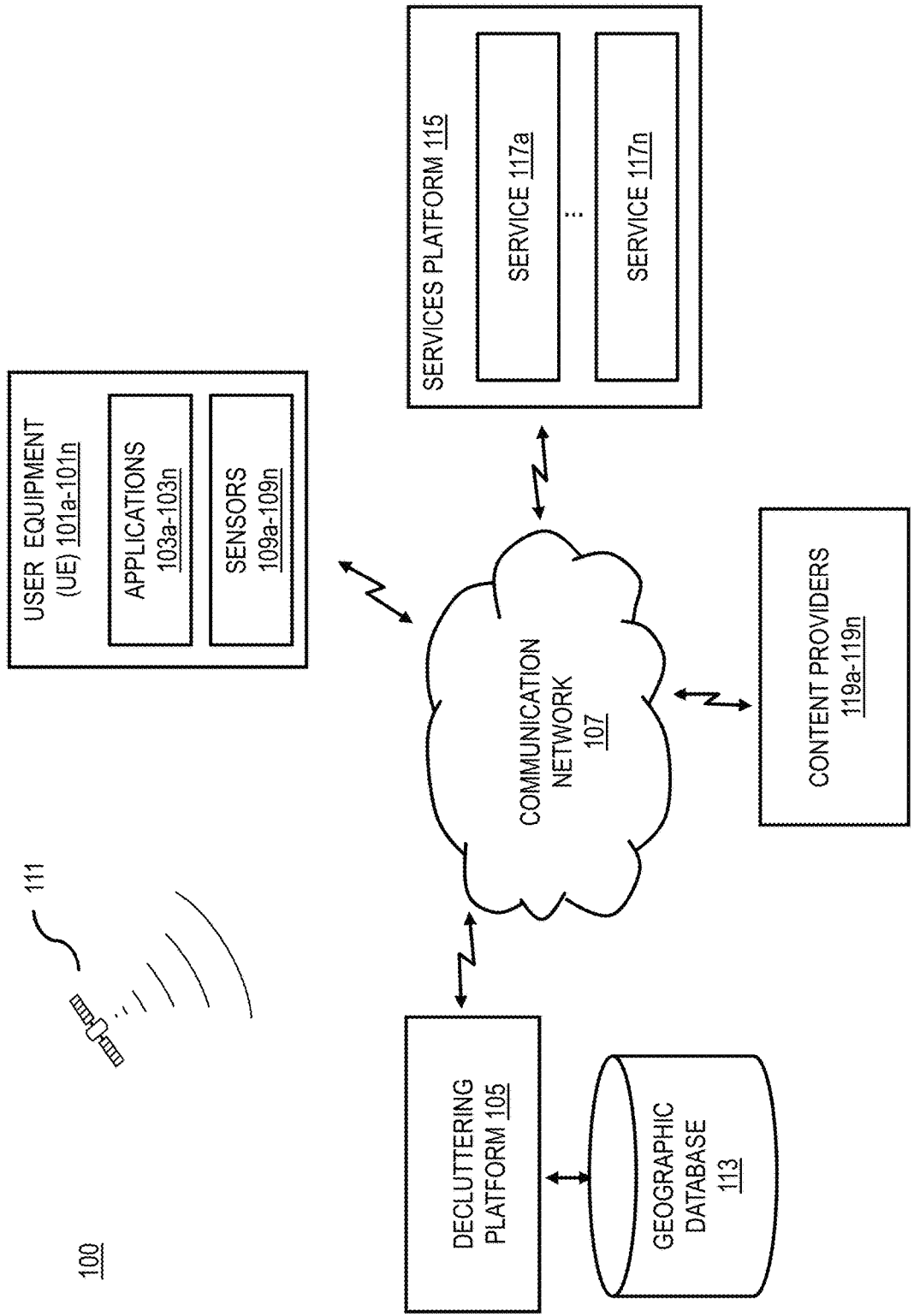
FIG. 1 is a diagram of a system capable of classifying objects that are present at a geo-location and providing an uncluttered presentation of images of some of the objects in an application such as a map application, according to one embodiment.

FIG. 1 is a diagram of a system capable of classifying objects that are present at a geo-location and providing an uncluttered presentation of images of some of the objects in an application such as a map application, according to one embodiment. As previously discussed, one area of interest among service providers and device manufacturers has been accurate and efficient collection and processing of data associated with objects that may be present at a given geo-location or a region-of-interest (ROI) and identifying/classifying the objects. A triangular mesh of a geo-location includes a 3D surface model, which may be analogous to a photograph. Although human vision and intellect may interpret objects in a 3D surface model, there is no intrinsic differentiation between different objects in a map. In one scenario, a process may be utilized to convert 3D surface models into individual building level models, which then may be utilized to facilitate a richer and user-friendly experience in interacting with applications utilizing the models. Based on parameters for presenting images of the objects via an application (e.g., a map) at a user device, the objects that have one or more classifications may be included in the presentation. For instance, in a two-dimensional (2D) polygon boundary of a ROI, an object (building, tree, road, etc.) in the ROI may be classified. Typically, ROIs may be generated by using/processing geometric data, but it may be unclear as to what type of objects may be present in the ROIs. In one example, the ROIs may be generated by use of clustering points, which may include data about an object that is present in the ROI. However, if the object is at a higher elevation with reference to the ground, the object may be a building or a cluster of large/tall trees. Therefore, the process of generating ROIs may not provide a clear indication as to what types of objects may be present in the ROI.

To solve this problem, system 100 may derive a 2D orthographic image from a textured mesh, which may be generated by use of a photogrammetry process for generating a set of triangles that represent a 3D surface model of a geo-location. Using the 2D image and 3D data (e.g., height), which may be derived from the textured mesh, one or more objects represented by the ROIs may be classified into an appropriate class among a multiple of classes at once; for example, an object may be classified as a building, a different structure, a tree, a road, etc., instead of just a binary classification of a building or a non-building. One or more classifying algorithms (e.g., Random Forrest based classifier) that can support multiple classes and provide confidence score or error probability may be utilized.

In one scenario, the system 100 may utilize one or more machine learning classification algorithms to identify and distinguish building objects from non-building objects (e.g., trees). The system may process inputs of 2D polygon footprints, including base and elevation information associated with one or more objects present therein, and classify the footprints into classes of building and non-building by utilizing color and texture information embedded in the original textured triangle mesh. The input may include aerial images and associated 3D data as well as light detection and ranging (LIDAR) data that, for example, may be utilized to generate a map of a geographical region. Then, a 3D-to-2D projection may be applied to obtain a 2D color image patch for each extracted footprint. Next, each generated image patch may be associated with one or more features (e.g., feature vectors directly computed based on textured 3D polygon region) for generating or training a classification model.

In one scenario, the textured mesh may be generated in real-time by using data provided by various sensors and devices at a geo-location. In a region-based approach, global spatial information such as spatial feature distributions (e.g., edge distributions, color histogram, etc.) may be captured and utilized for a more efficient (e.g., less computation cost) process than a pixel-based approach.

In one embodiment, the system 100 may determine one or more regions of interest associated with at least one geo-location, wherein the one or more regions of interest are at least one textured three-dimensional representation of one or more objects that may be present at the at least one geo-location. In one instance, the geo-location may be determined by a service provider or a user of a service or an application at a user device. In one embodiment, the at least one textured three-dimensional representation may be a polygon-based three-dimensional representation, providing height information, on which the three-dimensional texture information is mapped. In one embodiment, the at least one two-dimensional image representation may be at least one image texture patch. In one example, a photogrammetry process (e.g., an image based approach) may be utilized to generate a textured three-dimensional representation/model of the objects and surrounding environment, wherein the process includes measuring the images for determining the exact position of the surface points. For example, various cameras may be used to take photographs from different lines of sight of objects, e.g., buildings. These lines of sight are mathematically intersected to produce three-dimensional coordinates of an object.

In one embodiment, the system 100 may process and/or facilitate a processing of the at least one textured three-dimensional representation to determine at least one two-dimensional footprint and three-dimensional geometry information for the one or more objects. In some instances, a footprint may include base and height information associated with an object.

In one embodiment, the system 100 may cause a generation of at least one two-dimensional image representation of the one or more regions of interest by causing, at least in part, a projection of three-dimensional texture information of the at least one textured three-dimensional representation onto the at least one two-dimensional footprint. In one embodiment, the projection of three-dimensional texture information of the at least one textured three-dimensional representation onto the at least one two-dimensional footprint is at least one orthographic projection. The perspective projection of a 3D object onto a 2D representation may provide a 2D color image patch for each footprint.

In one embodiment, the system 100 may cause a classification of the one or more objects based, at least in part, on the at least one two-dimensional image representation and the three-dimensional geometry information. In one embodiment, the classification of the one or more objects includes, at least in part, a binary classification of the one or more objects as either a building object or a non-building object. For example, a building may be classified as a building while a tree may be classified as a non-building.

In one embodiment, the system 100 may cause an extraction of one or more features from the at least one two-dimensional image representation, wherein the classification of the one or more objects is based, at least in part, on one or more features. The system 100 may process 3D geometric data associated with regions of interest to determine the features using techniques including but not limited to geometric measures and machine learning. In one embodiment, the one or more features include, at least in part, a geometry feature, a structural feature, an edge intensity feature, a color feature, a color histogram feature, an edge orientation feature, or a combination thereof.

In one embodiment, the system 100 may cause a training of one or more classification models based, at least in part, on the one or more features. In one instance, data associated with classifications of regions of interest may be utilized to generate a database which may be utilized to train one or more classifying models/algorithms.

In one embodiment, the system 100 may cause a classification of one or more other regions of interest based, at least in part, on the one or more classification models. For example, a classification model used to classify a region of interest may be utilized to classify one or more other regions of interest. In one embodiment, the one or more other regions of interest may be at one or more other geo-locations. For example, a classification model used to classify a region of interest at one geo-location may be utilized to classify one or more other regions of interest at the same or a different geo-location.

In one embodiment, the system 100 may determine classification accuracy information for the one or more classification models based, at least in part, on the classification of the one or more regions of interest, the one or more other regions of interest, or a combination thereof that are associated with one or more previously labeled objects. In one embodiment, classification of an object based on a classification model may be compared to classification of another object based on the same classification model to determine accuracy of the classifications. In one embodiment, classification of an object based on a classification model may be compared to classification of the same object based on another classification model to determine accuracy of the classifications. In various embodiments, the classifications may be at the same or different geo-locations.

In various embodiments, the system 100 may cause, at least in part, an updating of the one or more classification models; the classification of the one or more regions of interest, the one or more other regions of interest, or a combination thereof; or a combination thereof based, at least in part, on the classification accuracy information. For example, classification accuracy information associated with an object, another object, or one or more classification models may be utilized to update the classification of the object or the other object, or to update the one or more classification models.

In one embodiment, the system 100 may cause, at least in part, an initiation of at least one clutter removal process with respect to the one or more regions of interest based, at least in part, on the classification. In various embodiments, based on parameters associated with a service provider, a service provider system, a user, a user device, use target, etc., a clutter removal (declutter) process may be initiated to remove one or more regions of interest and present the remaining regions of interest. For example, based on one or more parameters; roads, buildings, and sidewalks may be presented on a map while trees and other structures may be removed from the presentation.

In one embodiment wherein the classification of the one or more objects includes a multiple-class classification, the system 100 may determine probability information that the one or more objects are in one or more of the plurality of classes associated with the multiple-class classification. For example, a monument may be classified as a structure, but it also may be classified as a building.

The system 100 may include user equipment 101a-101n (UE 101). By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

The system 100 may also include applications 103a-103n (applications 103). By way of example, the applications 103 may be any type of application that is executable at the UE 101, such as location-based service applications, navigation applications, mapping application, sensor monitoring applications, calendar applications, content provisioning services, camera/imaging application, media player applications, social networking applications, and the like. In one embodiment, one or more of the applications 103 at the UE 101 may act as a client for the decluttering platform 105 and may perform one or more functions associated with the functions of the decluttering platform 105 by interacting with the decluttering platform 105 over the communication network 107.

The system 100 may also include sensors 109a-109n (sensors 109). By way of example, the sensors 109 may be any type of sensor, which may interface with or be included in the UE 101. In certain embodiments, the sensors 109 may include, for example, a global positioning sensor for gathering location data (e.g., GPS), a network detection sensor for detecting wireless signals or receivers for different short-range communications (e.g., Bluetooth, Wi-Fi, Li-Fi, near field communication, etc.), temporal information sensor, a camera/imaging sensor for gathering image data, an audio recorder for gathering audio data, and the like. In one scenario, the sensors 109 may include, light sensors, orientation sensors augmented with height sensing and acceleration sensing, tilt sensors to detect the degree of incline or decline of the vehicle along a path of travel, moisture sensors, pressure sensors, etc. In one embodiment, the UE 101 may include GPS receivers to obtain geographic coordinates from satellites 111 for determining current location and time associated with at least one UE 101. In another embodiment, the sensors 109 may be a LIDAR device or sensor, a laser device, and/or other device that collects data points, such as three dimensional data, by transmitting and receiving light. For example, the LIDAR sensors use one or more lasers to collect data points representing on-ground objects in a surrounding area. The LIDAR sensors may collect and gather data points in a point cloud, such as a three dimensional point cloud, in which each data point corresponds to a local coordinate, such as (x, y, z). In one scenario, LIDAR sensors not only collect street level (i.e., outdoor) 3D point clouds, but also indoor three dimensional point clouds.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the decluttering platform 105 may include multiple interconnected components. The decluttering platform 105 may include multiple servers, intelligent networking devices, computing devices, algorithms, components and corresponding software for classifying objects that are present at a geo-location and providing an uncluttered presentation of images of some of the objects in an application such as a map application. Example components of the decluttering platform 105 will be illustrated in FIG. 2 and further discussed.

In one embodiment, the decluttering platform 105 may include or have access to geographic database 113 to access or store any kind of data, such as one or more contextually relevant geo-location points, location proximity information, temporal information, contextual information, historical user information, etc. Data stored in the geographic database 113 may, for instance, be provided by the UE 101, the sensors 109, the services platform 115, one or more services 117a-117n (services 117), or one or more content providers 119a-119n (content providers 119). The geographic database 113 may also include data about places, such as cities, towns, or other communities, and other geographic features, such as bodies of water, mountain ranges, buildings, etc. The geographic database 113 may be maintained by the content providers 119 in association with the services platform 115 (e.g., a map developer). The map developer may collect geographic data to generate and enhance the geographic database 113. The data may be obtained from various sources, such as municipalities or respective geographic authorities. In addition, remote sensing, such as aerial or satellite photography, may be used.

The services platform 115 may include any type of service. By way of example, the services platform 115 may include mapping services, navigation services, social networking services, content (e.g., audio, video, images, etc.) provisioning services, application services, storage services, contextual information determination services, location based services, information (e.g., weather, news, etc.) based services, etc. In one embodiment, the services platform 115 may interact with the UE 101, the decluttering platform 105 and the content providers 119 to supplement or aid in the processing of the content information (e.g., location information).

In one embodiment, the services 117 may be an online service that reflects interests and/or activities of users. In one scenario, the services 117 provide representations of each user (e.g., a profile), his/her social links, and a variety of additional information. The services 117 allow users to share location information, navigation related information, activities information, contextual information, historical user information and interests within their individual networks, and provides for data portability.

The content providers 119 may provide content to the UE 101, the decluttering platform 105, and the services 117 of the services platform 115. The content provided may be any type of content, such as textual content, image content, video content etc. In one embodiment, the content providers 119 may provide content that may supplement content of the applications 103, sensors 109, or a combination thereof. In another embodiment, the content providers 119 may also store content associated with the UE 101, the decluttering platform 105, and the services 117 of the services platform 115. In a further embodiment, the content providers 119 may manage access to a central repository of data, and offer a consistent, standard interface to data.

By way of example, the UE 101, the decluttering platform 105, the services platform 115, and the content providers 119 may communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
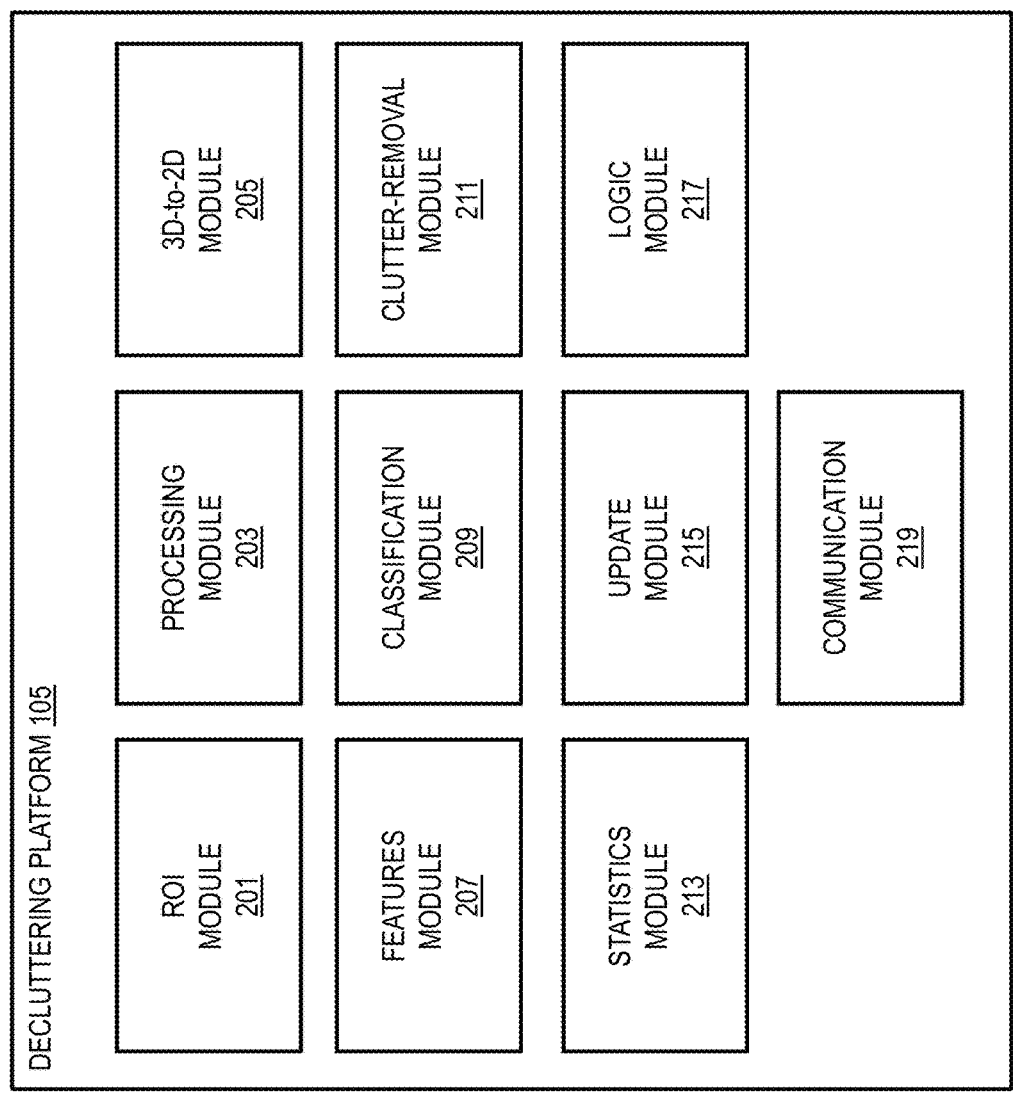
FIG. 2 is a diagram of the components of the decluttering platform 105, according to one embodiment.

FIG. 2 is a diagram of the components of the decluttering platform 105, according to one embodiment. By way of example, the decluttering platform 105 may include one or more components for classifying objects that are present at a geo-location and providing an uncluttered presentation of images of some of the objects in an application such as a map application. In one embodiment, the decluttering 105 may include a ROI module 201, a processing module 203, a 3D-to-2D module 205, a features module 207, a classification module 209, a clutter-removal module 211, a statistics module 213, an update module 215, a logic module 217, and a communication module 219. It is contemplated that the functions of these components may be combined in one or more components or performed by other components with similar functionalities.

In one embodiment, the ROI module 201 may determine one or more ROIs associated with a geo-location, wherein the ROIs may be textured three-dimensional representations of one or more objects that may be present at geo-location.

In one instance, the geo-location may be determined by a service provider or a user of a service or an application at a user device.

In one embodiment, the processing module 203 may process the textured three-dimensional representation to determine a two-dimensional footprint and three-dimensional geometry information for the one or more objects. In some instances, a footprint may include base and roof elevation information associated with an object.

In one embodiment, the 3D-to-2D module 205 may cause a generation of a two-dimensional image representation of the one or more ROIs by causing a projection of three-dimensional texture information of the textured three-dimensional representation onto a two-dimensional footprint. In one embodiment, the projection of three-dimensional texture information of the textured three-dimensional representation onto the two-dimensional footprint is an orthographic projection.

In one embodiment, the features module 207 may cause an extraction of one or more features from the two-dimensional image representation, wherein the classification of the one or more objects may be based on one or more features. In one embodiment, the one or more features may include a geometry feature, a structural feature, an edge intensity feature, a color feature, a color histogram feature, an edge orientation feature, or a combination thereof.

In one embodiment, the classification module 209 may utilize one or more classifying algorithms (e.g., machine learning algorithms) to cause a classification of the one or more objects based on the at least one two-dimensional image representation and the three-dimensional geometry information. In one embodiment, the classification of the one or more objects may include a binary classification of the one or more objects as either a building object or a non-building object. For example, a building may be classified as a building while a tree may be classified as a non-building. Additionally, the classification module 209 may cause a training of one or more classification models based, at least in part, on the one or more features. In one instance, data associated with classifications of regions of interest may be utilized to generate a database which may be utilized to train one or more classifying models/algorithms. Further, the classification module 209 may cause a classification of one or more other regions of interest based on the one or more classification models. For example, a classification model used to classify a region of interest may be utilized to classify one or more other regions of interest. In one embodiment, the one or more other regions of interest may be at one or more other geo-locations. For example, a classification model used to classify a region of interest at one geo-location may be utilized to classify one or more other regions of interest at the same or a different geo-location.

In one embodiment, the clutter-removal module 211 may initiate of a clutter removal process with respect to the one or more regions of interest based on the classification. In various embodiments, based on parameters associated with a service provider, a service provider system, a user, a user device, use target, etc., a clutter removal (declutter) process may be initiated to remove one or more regions of interest and present the remaining regions of interest. For example, based on one or more parameters; roads, buildings, and sidewalks may be presented on a map while trees and other structures may be removed from the presentation.

In one embodiment, the statistics module 213 may determine classification accuracy information for the one or more classification models based on the classification of the one or more regions of interest, the one or more other regions of interest, or a combination thereof that are associated with one or more previously labeled objects. In one embodiment, classification of an object based on a classification model may be compared to classification of another object based on the same classification model to determine accuracy of the classifications. In one embodiment, classification of an object based on a classification model may be compared to classification of the same object based on another classification model to determine accuracy of the classifications. In various embodiments, the classifications may be at the same or different geo-locations.

In one embodiment, the update module 215 may cause an updating of the one or more classification models; the classification of the one or more regions of interest, the one or more other regions of interest, or a combination thereof; or a combination thereof based on the classification accuracy information. For example, classification accuracy information associated with an object, another object, or one or more classification models may be utilized to update the classification of the object or the other object, or to update the one or more classification models.

In one embodiment, the logic module 217 may manage tasks, including tasks performed by the other modules. For example, although the other modules may perform their actual tasks, the logic module 217 may determine when and how those tasks are performed or otherwise direct the other modules to perform the task. In one embodiment, the logic module 217 may determine to process the one or more location traces in substantially real-time, batch mode, according to a schedule, or a combination thereof. By way of example, the schedule may be based, at least in part, on computational resources, amount of available data, etc.

The communication module 219 may be used for communication between various elements of the system 100 as well as between modules, elements, components, etc. of the decluttering platform 105. For example, the communication module 219 may be used to communicate commands, requests, data, etc., to/from the applications 103, the content providers 119, or the like.

Figure 3:
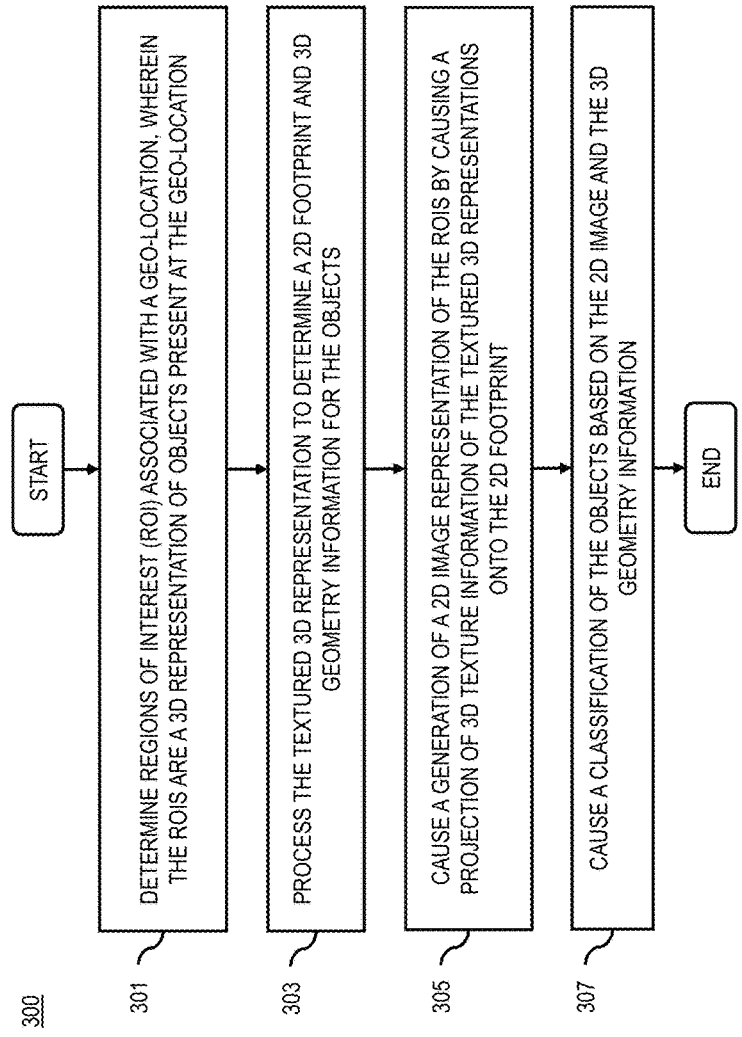
Figure 4:
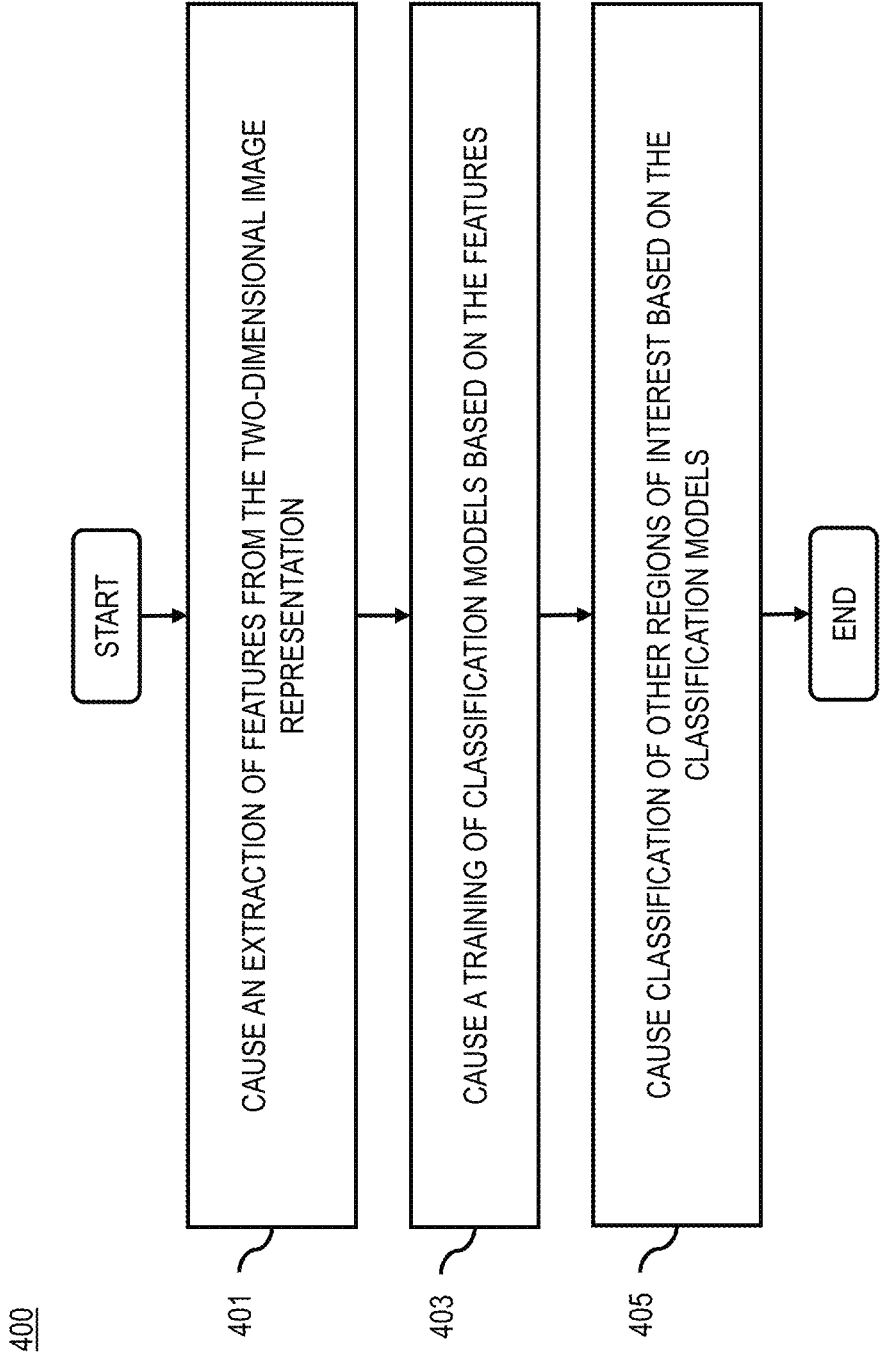
Figure 10:
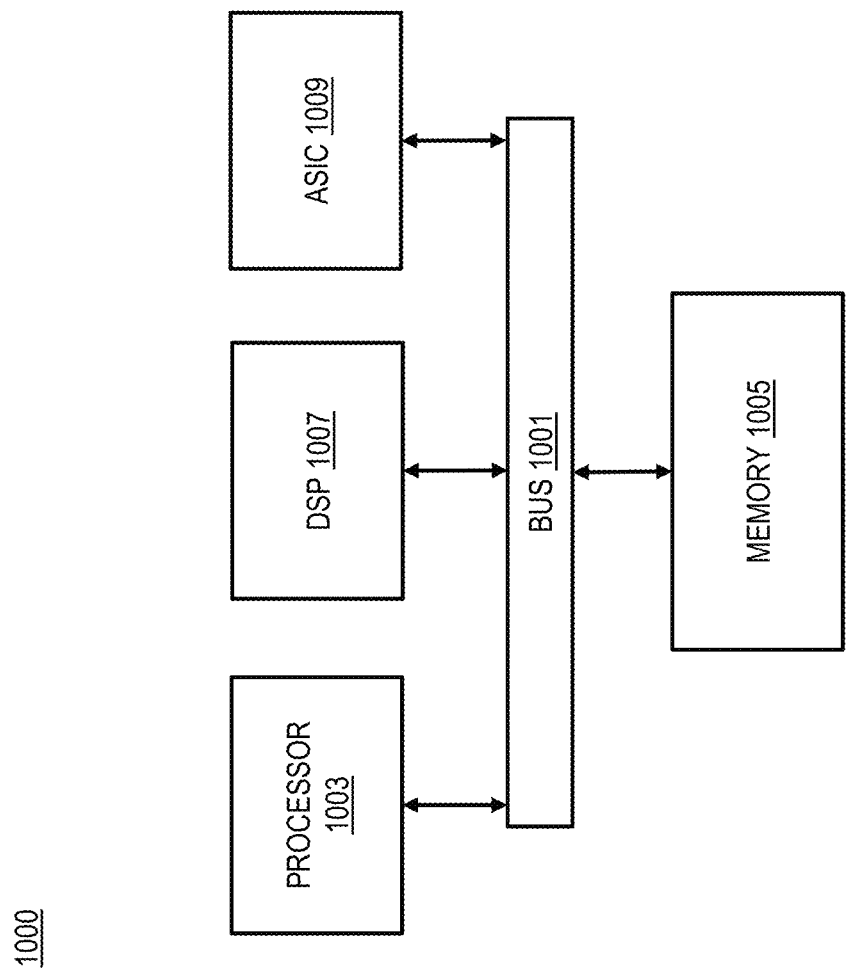
FIG. 10 is a diagram of a chip set that can be used to implement an embodiment of the invention.

FIGS. 3 through 5 are flowcharts of various processes for, at least, classifying objects that are present at a geo-location and providing an uncluttered presentation of images of some of the objects in an application such as a map application, according to various embodiments. In various embodiments, decluttering platform 105 may perform one or more portions of the processes 300, 400, and 500 which may be implemented in, for instance, a chip set including a processor and a memory as shown in FIG. 10. As such, the decluttering platform 105 can provide means for accomplishing various parts of the process 300, 400, and 500 as well as means for accomplishing other processes in conjunction with other components of the system 100. Throughout these processes, the decluttering platform 105 may be referred to as completing various portions of the processes 300, 400, and 500, however, it is understood that other components of the system 100 can perform some of and/or all of the process steps. Further, for clarity in discussing the 300, 400, and 500 processes, the decluttering platform 105 is referred to as completing various steps of said processes; however, said processes and/or example steps described therein may be performed in any suitable order and/or may be optional.

The process 300 may begin at step 301 of the FIG. 3, where the decluttering platform 105 may determine one or more regions of interest associated with at least one geo-location, wherein the one or more regions of interest are at least one textured three-dimensional representation of one or more objects that may be present at the at least one geo-location. In one instance, the geo-location may be determined by a service provider or a user of a service or an application at a user device. In one embodiment, the at least one textured three-dimensional representation may be a polygon-based three-dimensional representation on which the three-dimensional texture information is mapped. In one embodiment, the at least one two-dimensional image representation may be at least one image texture patch. In one example, a photogrammetry process (e.g., an image based approach) may be utilized to generate a textured three-dimensional representation/model of the objects and surrounding environment, wherein the process includes measuring the images for determining the exact position of the surface points. For example, various cameras may be used to take photographs from different lines of sight of objects, e.g., buildings. These lines of sight are mathematically intersected to produce three-dimensional coordinates of an object.

In 303, the decluttering platform 105 may process and/or facilitate a processing of the at least one textured three-dimensional representation to determine at least one two-dimensional footprint and three-dimensional geometry information for the one or more objects. In some instances, a footprint may include base and roof elevation information associated with an object.

In 305, the decluttering platform 105 may cause a generation of at least one two-dimensional image representation of the one or more regions of interest by causing, at least in part, a projection of three-dimensional texture information of the at least one textured three-dimensional representation onto the at least one two-dimensional footprint. In one embodiment, the projection of three-dimensional texture information of the at least one textured three-dimensional representation onto the at least one two-dimensional footprint is at least one orthographic projection. The perspective projection of a 3D object onto a 2D representation may provide a 2D color image patch for each footprint.

In 307, the decluttering platform 105 may cause a classification of the one or more objects based, at least in part, on the at least one two-dimensional image representation and the three-dimensional geometry information. In one embodiment, the classification of the one or more objects includes, at least in part, a binary classification of the one or more objects as either a building object or a non-building object. For example, a building may be classified as a building while a tree may be classified as a non-building.

The process 400 may begin at step 401 of the FIG. 4, where the decluttering platform 105 may cause an extraction of one or more features from the at least one two-dimensional image representation, wherein the classification of the one or more objects is based, at least in part, on one or more features. The system 100 may process 3D geometric data associated with regions of interest to determine the features using techniques including but not limited to geometric measures and machine learning. In one embodiment, the one or more features include, at least in part, a geometry feature, a structural feature, an edge intensity feature, a color feature, a color histogram feature, an edge orientation feature, or a combination thereof.

In 403, the decluttering platform 105 may cause a training of one or more classification models based, at least in part, on the one or more features. In one instance, data associated with classifications of regions of interest may be utilized to generate a database which may be utilized to train one or more classifying models/algorithms.

In 405, the decluttering platform 105 may cause a classification of one or more other regions of interest based, at least in part, on the one or more classification models. For example, a classification model used to classify a region of interest may be utilized to classify one or more other regions of interest. In one embodiment, the one or more other regions of interest may be at one or more other geo-locations. For example, a classification model used to classify a region of interest at one geo-location may be utilized to classify one or more other regions of interest at the same or a different geo-location.

The process 500 may begin at step 501 of the FIG. 5, where the decluttering platform 105 may determine classification accuracy information for the one or more classification models based, at least in part, on the classification of the one or more regions of interest, the one or more other regions of interest, or a combination thereof that are associated with one or more previously labeled objects. In one embodiment, classification of an object based on a classification model may be compared to classification of another object based on the same classification model to determine accuracy of the classifications. In one embodiment, classification of an object based on a classification model may be compared to classification of the same object based on another classification model to determine accuracy of the classifications. In various embodiments, the classifications may be at the same or different geo-locations.

In 503, the decluttering platform 105 may cause, at least in part, an updating of the one or more classification models; the classification of the one or more regions of interest, the one or more other regions of interest, or a combination thereof; or a combination thereof based, at least in part, on the classification accuracy information. For example, classification accuracy information associated with an object, another object, or one or more classification models may be utilized to update the classification of the object or the other object, or to update the one or more classification models.

In 505, the decluttering platform 105 may cause, at least in part, an initiation of at least one clutter removal process with respect to the one or more regions of interest based, at least in part, on the classification. In various embodiments, based on parameters associated with a service provider, a service provider system, a user, a user device, use target, etc., a clutter removal (declutter) process may be initiated to remove one or more regions of interest and present the remaining regions of interest. For example, based on one or more parameters; roads, buildings, and sidewalks may be presented on a map while trees and other structures may be removed from the presentation.

In 507, where the classification of the one or more objects includes a multiple-class classification, the decluttering platform 105 may determine probability information that the one or more objects are in one or more of the plurality of classes associated with the multiple-class classification. For example, a monument may be classified as a structure, but it also may be classified as a building.

FIG. 6A illustrates a list of example features that may be utilized to classify an object, according to one embodiment. Table 600 includes categories of features and related subcategories that may be utilized in classification of an object. In this example, the categories include geometry 601, color 603, structure 605, color histogram 607, edge density 609, and edge orientation 611. As listed in the table 600, each category may include one or more subcategories for a more specific classification of the features of an object. For example, the geometry feature may include subcategories 613 that include orientation, shape ratio, eccentricity, area, height, and volume.

FIG. 6B illustrates a list of example statistical information associated with classification of objects, according to an embodiment. Table 650 includes information on a binary classification, building 651 vs. non-building 653, of an object and an overall accuracy 655 for this classification. Additionally, information on true positive (TP) 657—objects correctly classified as buildings, false positive (FP) 659—objects incorrectly classified as buildings, precision rate 661, recall (e.g., true positives) 663, and relative operating characteristic (ROC) curve area 665—illustrating the performance of the classifier. In various scenarios, classification of an object based on a classification model may be compared to classification of another object based on the same classification model to determine accuracy and statistical information of the classifications.

Figure 7A:
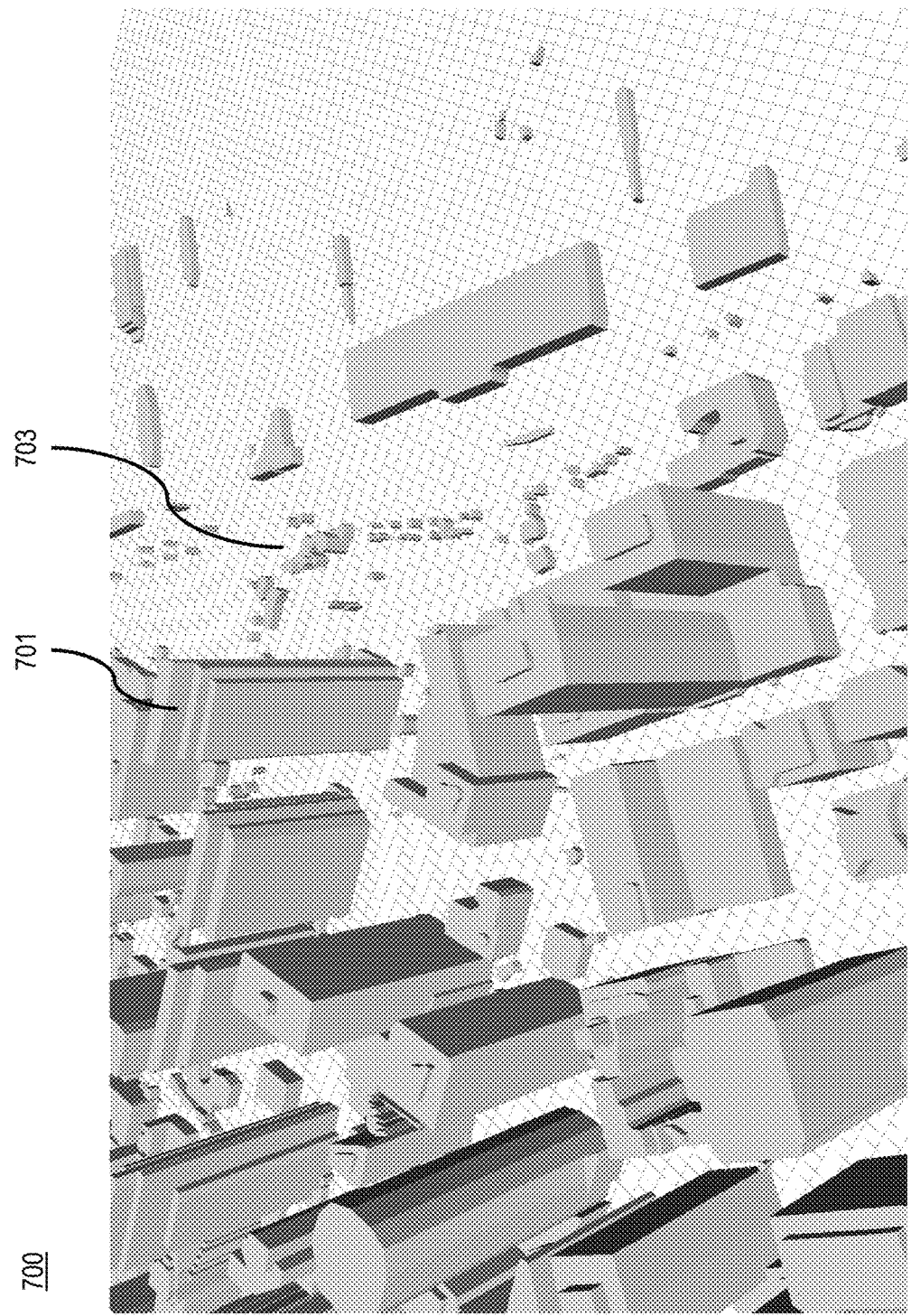
FIGS. 7A and 7B illustrate footprints of objects at a geo-location that includes various objects, according to various embodiments.
Figure 7B:
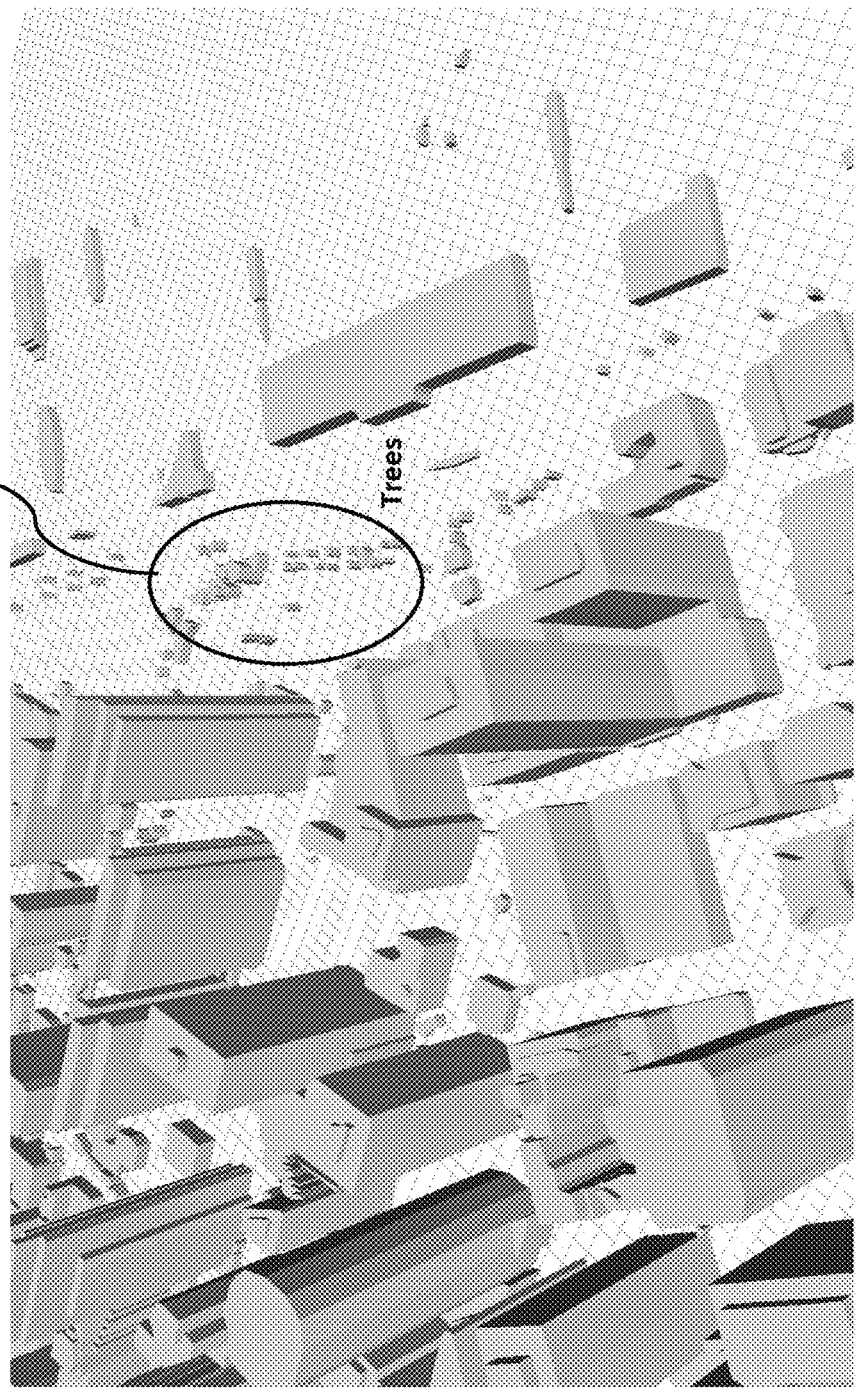

FIG. 7A illustrates footprints of objects at a geo-location that includes various objects, according to an embodiment. In diagram 700, the decluttering platform 105 may extract 3D footprints of buildings 701 without removal of non-building objects 703 (e.g., trees, roads, cars, people, etc.), where an example group of a non-building objects 703 (e.g., trees) is shown in FIG. 7B.

Figure 8A:
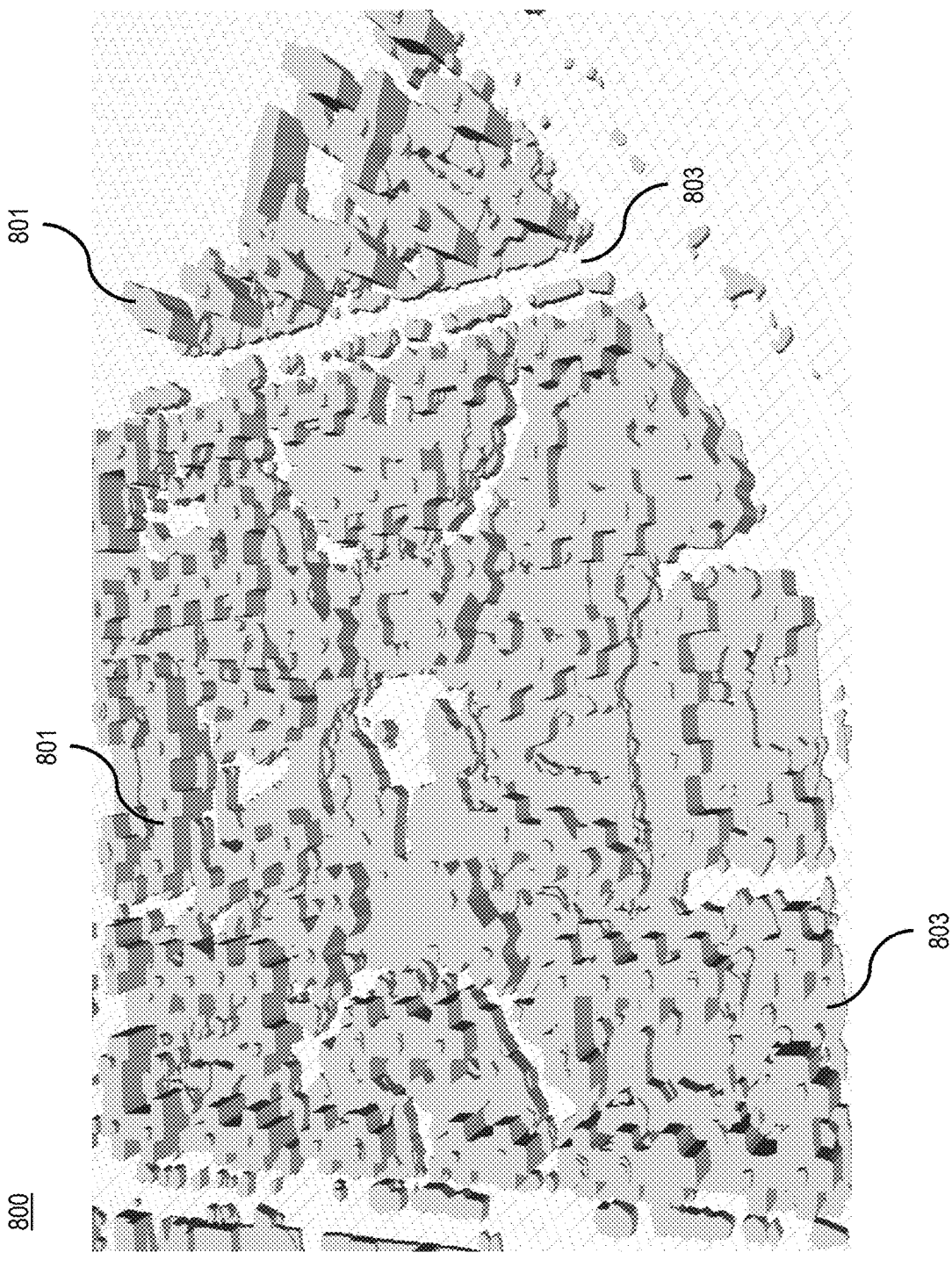
Figure 8B:
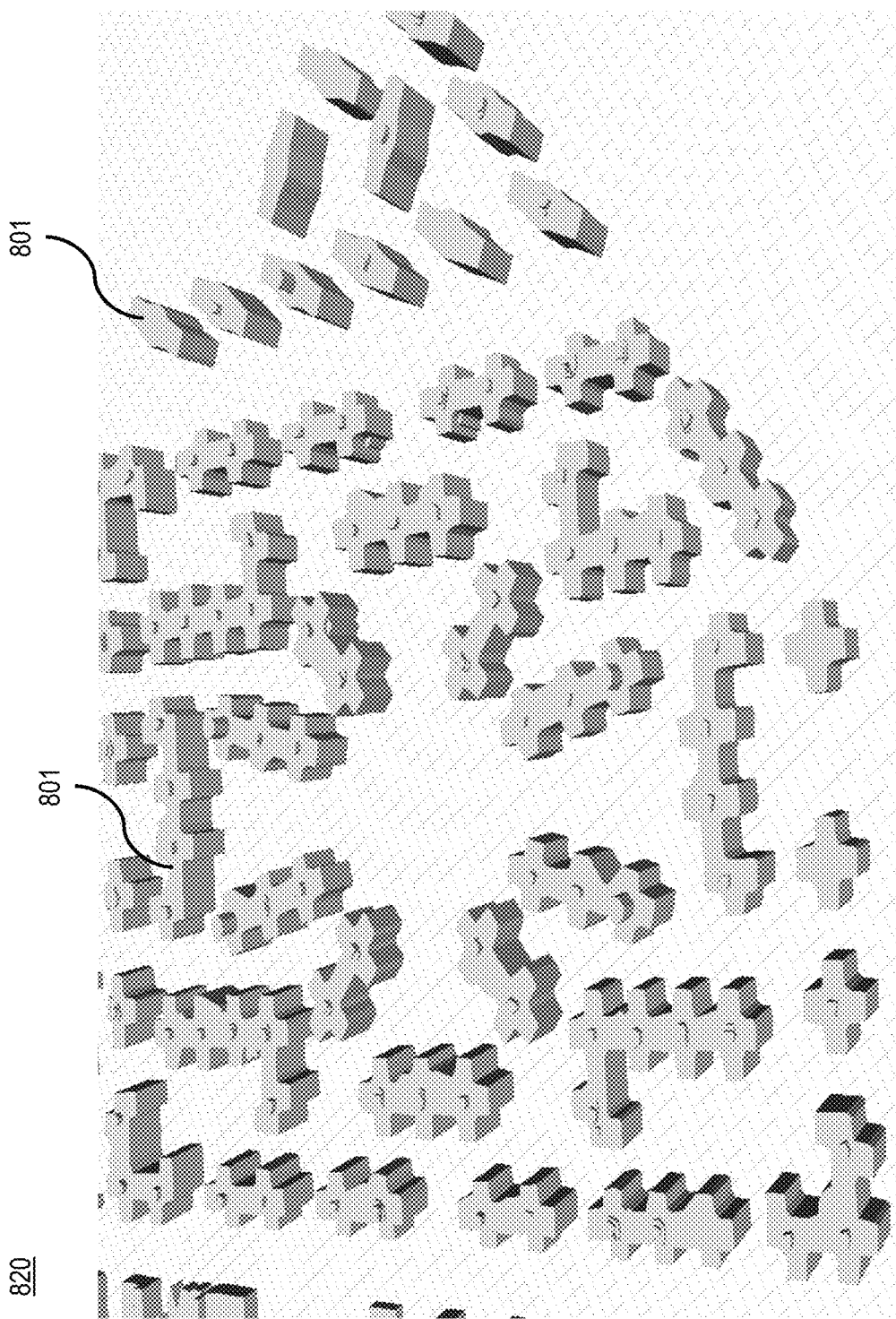

FIG. 8A illustrates a map of an example geo-location that includes various objects. Diagram 800 illustrates various objects present at a geo-location, which includes buildings, 801, and non-buildings, 803 (e.g., trees, bodies of water, roads, walkways, etc.) In FIG. 8B, diagram 820 illustrates a scenario where the decluttering platform 105 may classify and remove the non-building objects, 803, and only present the objects classified as buildings, 801. Similarly, FIG. 8C shows clutter removal of the objects classified as building, 801; and presentation of only non-building objects, 803. In one example, the classification of the objects may be based on height, color, texture, or the like features.

The processes described herein for classifying objects that are present at a geo-location and providing an uncluttered presentation of images of some of the objects in an application such as a map application may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
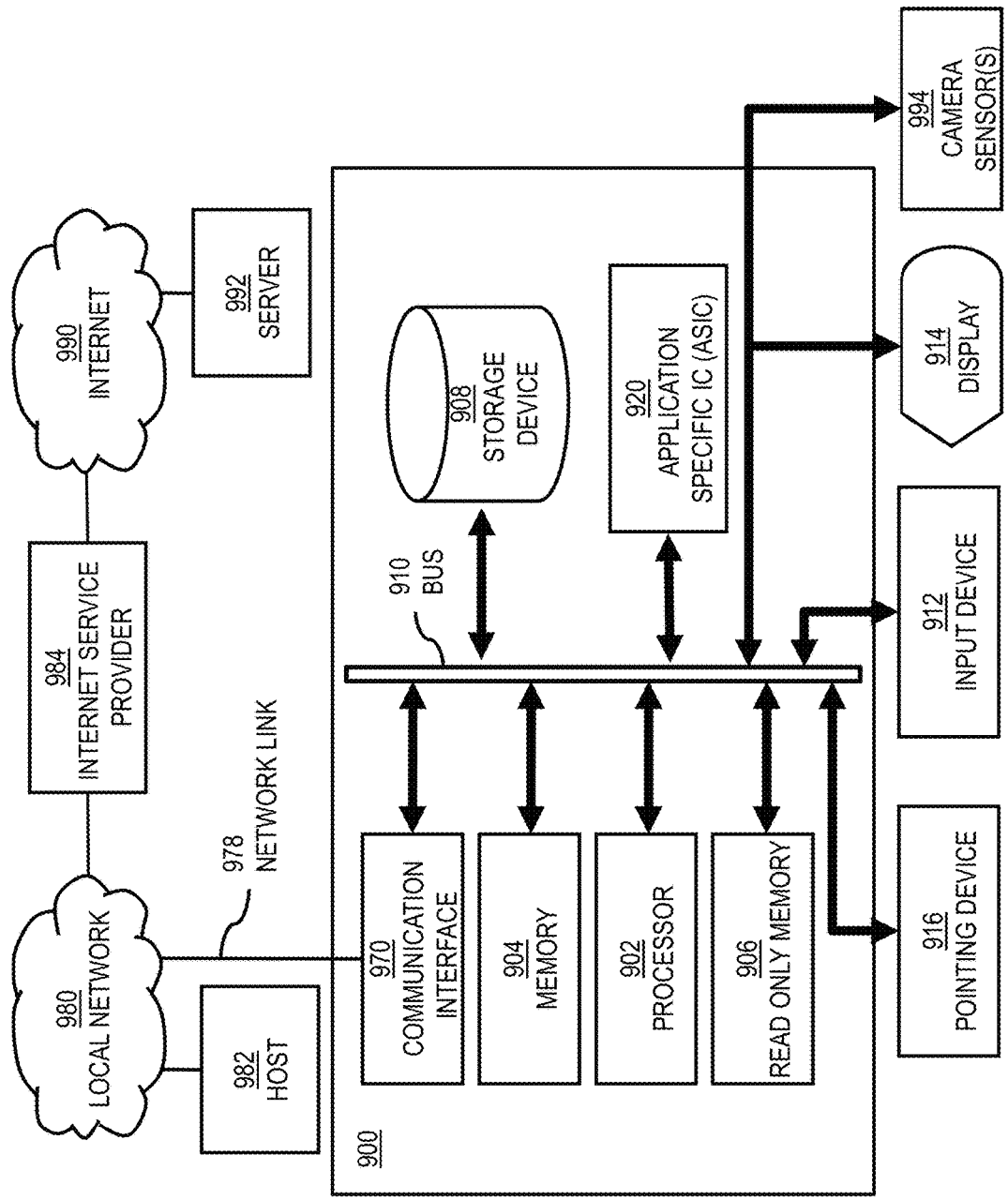
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to classify objects that are present at a geo-location and provide an uncluttered presentation of images of some of the objects in an application such as a map application as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of classifying objects that are present at a geo-location and providing an uncluttered presentation of images of some of the objects in an application such as a map application.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to classifying objects that are present at a geo-location and providing an uncluttered presentation of images of some of the objects in an application such as a map application. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for classifying objects that are present at a geo-location and providing an uncluttered presentation of images of some of the objects in an application such as a map application. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for classifying objects that are present at a geo-location and providing an uncluttered presentation of images of some of the objects in an application such as a map application, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for classifying objects that are present at a geo-location and providing an uncluttered presentation of images of some of the objects in an application such as a map application.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to classify objects that are present at a geo-location and provide an uncluttered presentation of images of some of the objects in an application such as a map application as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of classifying objects that are present at a geo-location and providing an uncluttered presentation of images of some of the objects in an application such as a map application.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to classify objects that are present at a geo-location and provide an uncluttered presentation of images of some of the objects in an application such as a map application. The memory 1005 also stores the data associated with or generated by the execution of the inventive steps.

Figure 11:
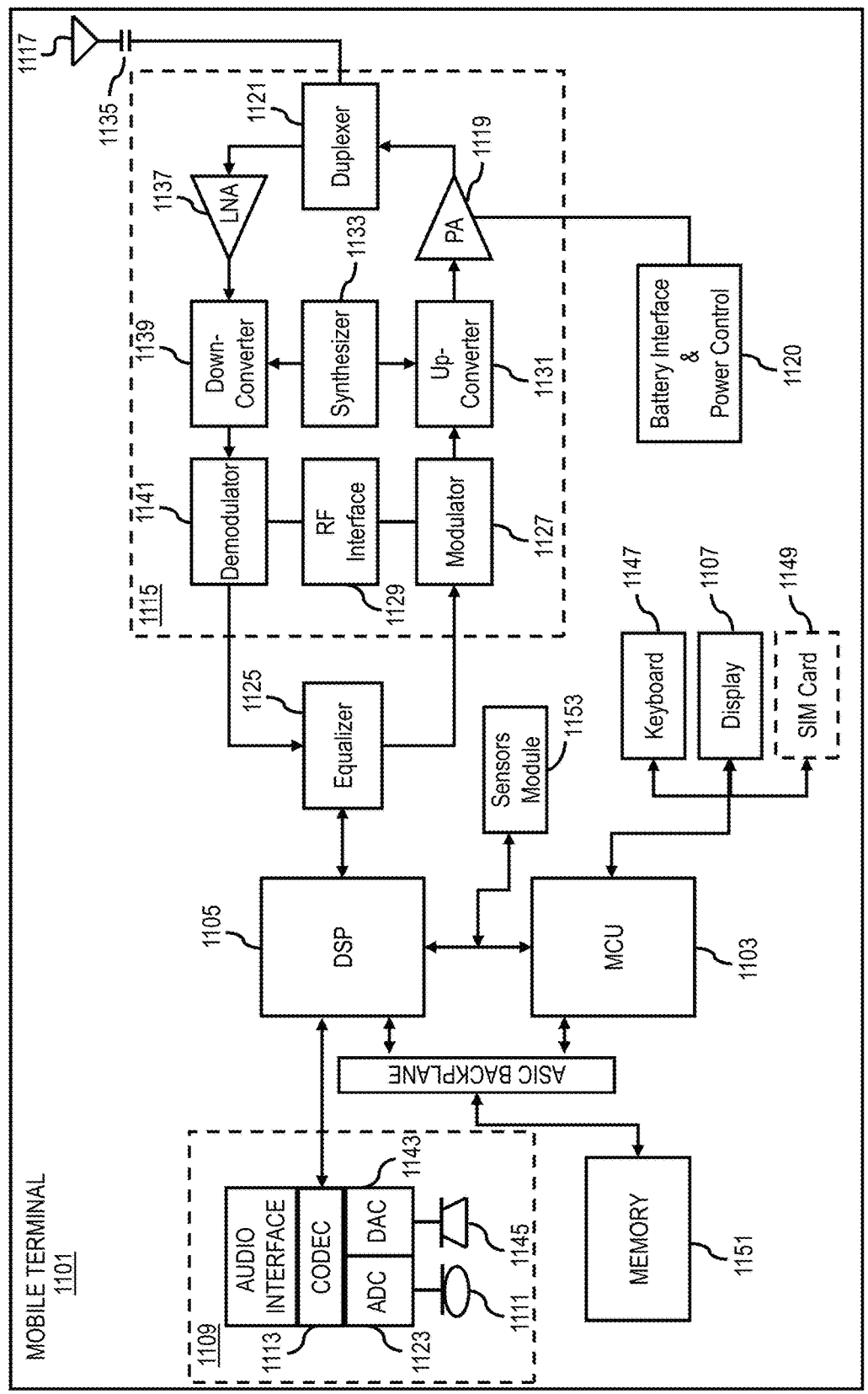
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of classifying objects that are present at a geo-location and providing an uncluttered presentation of images of some of the objects in an application such as a map application. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of classifying objects that are present at a geo-location and providing an uncluttered presentation of images of some of the objects in an application such as a map application. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to classify objects that are present at a geo-location and provide an uncluttered presentation of images of some of the objects in an application such as a map application The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, a sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. The methods and systems (including steps and components thereof) can be mixed, matched, and/or rearranged. Additionally more, fewer, or different method steps or device/system components may be used.

What is claimed is:

1. A method comprising:
    determining, by an apparatus, regions of interest associated with a geo-location, wherein each of the regions of interest is a textured polygon-based three-dimensional aerial photography representation of objects present at the geo-location;
    processing, by the apparatus, the textured polygon-based three-dimensional representation to determine a two-dimensional footprint and three-dimensional geometry information for the objects per region;
    in response to a selection of one or more aerial images, initiating, by the apparatus, an orthographic projection of three-dimensional texture information of the textured polygon-based three-dimensional aerial photography representation onto the two-dimensional footprint and a separation of the two-dimensional footprint into two-dimensional color image patches per region using top view information of the orthographic projection that includes respective colors and textures of tops of the objects while discarding front and side view information of the orthographic projection that include colors and textures of fronts and sides of the objects; and
    initiating, by the apparatus, a classification of one or more of the two-dimensional color image patches each as corresponding to a plurality of building objects and other one or more of the two-dimensional color image patches each corresponding to one or more non-building objects based on information of respective aerial photography heights of the objects,
    wherein a map application presentation is provided on a user interface based on the one or more of the two-dimensional color image patches each corresponding to the respective plurality of building objects.

2. A method of claim 1, further comprising:
    causing, at least in part, an extraction of one or more features from the two-dimensional color image patches, wherein the classification of the one or more of the two-dimensional color image patches is based, at least in part, on one or more features.

3. A method of claim 2, wherein the one or more features include, at least in part, a geometry feature, a structural feature, an edge intensity feature, a color feature, a color histogram feature, an edge orientation feature, or a combination thereof.

4. A method of claim 2, further comprising:
    causing, at least in part, a training of one or more classification models based, at least in part, on the one or more features; and
    causing, at least in part, a classification of one or more other regions of interest based, at least in part, on the one or more classification models.

5. A method of claim 4, further comprising:
    determining classification accuracy information for the one or more classification models based, at least in part, on the classification of the one or more of the two-dimensional color image patches, the one or more other regions of interest, or a combination thereof that are associated with one or more previously labeled objects; and
    causing, at least in part, an updating of (a) the one or more classification models; (b) the classification of the one or more of the two-dimensional color image patches, the classification of the one or more other regions of interest, or a combination thereof; or (c) a combination thereof based, at least in part, on the classification accuracy information.

6. A method of claim 1, further comprising:
    causing, at least in part, an initiation of at least one clutter removal process with respect to the regions of interest based, at least in part, on the classification.

7. A method of claim 1, wherein the geo-location is a city, and the one or more non-building objects are further classified into a tree, a road, a car, a human, or a combination thereof, and the method further comprising:
    determining probability information that the one or more non-building objects are a tree, a road, a car, a human, or a combination thereof per region.

8. A method of claim 1, further comprising:
    initiating, by the apparatus, a switch on the user interface between a presentation of only the other one or more two-dimensional color image patches each corresponding to the one or more non-building objects and the presentation of only the one or more of the two-dimensional color image patches each corresponding to the respective plurality of building objects; and calculating one or more statistic features for the one or more two-dimensional color image patches each corresponding to the respective plurality of building objects per region, wherein the one or more statistic features includes geometry, color, structure, color histogram, edge density, edge orientation, or a combination thereof, wherein the classification of the objects uses the one or more statistic features.

9. A method of claim 1, wherein the textured polygon-based three-dimensional aerial photography representation is a triangular mesh three-dimensional representation on which the three-dimensional texture information is mapped.

10. A method of claim 1, wherein the respective aerial photography heights of the objects are calculated based, at least in part, on base and roof elevations associated with the objects in the region.

11. An apparatus comprising:
at least one processor; and
at least one memory including computer program code for one or more programs,
the at least one memory and the computer program code configured to, with the at least one processor, cause the apparatus to perform at least the following, determine regions of interest associated with a geo-location, wherein each of the regions of interest is a textured polygon-based three-dimensional aerial photography representation of objects present at the geo-location;
process the textured polygon-based three-dimensional representation to determine a two-dimensional footprint and three-dimensional geometry information for the objects per region;
in response to a selection of one or more aerial images, initiate an orthographic projection of three-dimensional texture information of the textured polygon-based three-dimensional aerial photography representation onto the two-dimensional footprint and a separation of the two-dimensional footprint into two-dimensional color image patches per region using top view information of the orthographic projection that includes respective colors and textures of tops of the objects while discarding front and side view information of the orthographic projection that include colors and textures of fronts and sides of the objects; and
initiate a classification of one or more of the two-dimensional color image patches each as corresponding to a plurality of building objects and other one or more of the two-dimensional color image patches each corresponding to one or more non-building objects based on information of respective aerial photography heights of the objects,
wherein a map application presentation is provided on a user interface based on the one or more of the two-dimensional color image patches each corresponding to the respective plurality of building objects.

12. An apparatus of claim 11, wherein the apparatus is further caused to:
cause, at least in part, an extraction of one or more features from the two-dimensional color image patches,
wherein the classification of the one or more of the two-dimensional color image patches is based, at least in part, on one or more features.

13. An apparatus of claim 12, wherein the one or more features include, at least in part, a geometry feature, a structural feature, an edge intensity feature, a color feature, a color histogram feature, an edge orientation feature, or a combination thereof.

14. An apparatus of claim 12, wherein the apparatus is further caused to:
cause, at least in part, a training of one or more classification models based, at least in part, on the one or more features; and
cause, at least in part, a classification of one or more other regions of interest based, at least in part, on the one or more classification models.

15. An apparatus of claim 14, wherein the apparatus is further caused to:
determine classification accuracy information for the one or more classification models based, at least in part, on the classification of the one or more of the two-dimensional color image patches, the one or more other regions of interest, or a combination thereof that are associated with one or more previously labeled objects; and
cause, at least in part, an updating of (a) the one or more classification models; (b) the classification of the one or more of the two-dimensional color image patches, the classification of the one or more other regions of interest, or a combination thereof; or (c) a combination thereof based, at least in part, on the classification accuracy information.

16. An apparatus of claim 11, wherein the apparatus is further caused to:
cause, at least in part, an initiation of at least one clutter removal process with respect to the regions of interest based, at least in part, on the classification.

17. An apparatus of claim 11, wherein the geo-location is a city, and the one or more non-building objects are further classified into a tree, a road, a car, a human, or a combination thereof, the apparatus is further caused to:
determine probability information that the one or more non-building objects are a tree, a road, a car, a human, or a combination thereof per region.

18. A non-transitory computer-readable storage medium carrying one or more sequences of one or more instructions which, when executed by one or more processors, cause an apparatus to perform:
determining regions of interest associated with a geo-location, wherein each of the regions of interest is a textured polygon-based three-dimensional aerial photography representation of objects present at the geo-location;
processing the textured polygon-based three-dimensional representation to determine a two-dimensional footprint and three-dimensional geometry information for the objects per region;
in response to a selection of one or more aerial images, initiating an orthographic projection of three-dimensional texture information of the textured polygon-based three-dimensional aerial photography representation onto the two-dimensional footprint and a separation of the two-dimensional footprint into two-dimensional color image patches per region using top view information of the orthographic projection that includes respective colors and textures of tops of the objects while discarding front and side view information of the orthographic projection that include colors and textures of fronts and sides of the objects; and
initiating a classification of one or more of the two-dimensional color image patches each as corresponding to a plurality of building objects and other one or more of the two-dimensional color image patches each corresponding to one or more non-building objects based on information of respective aerial photography heights of the objects, wherein a map application presentation is provided on a user interface based on the one or more of the two-dimensional color image patches each corresponding to the respective plurality of building objects.

19. A non-transitory computer-readable storage medium of claim 18, wherein the apparatus is further caused to perform:

cause, at least in part, an extraction of one or more features from the two-dimensional color image patches, wherein the classification of the one or more of the two-dimensional color image patches is based, at least in part, on one or more features.

20. A non-transitory computer-readable storage medium of claim 19, wherein the apparatus is further caused to perform:

cause, at least in part, a training of one or more classification models based, at least in part, on the one or more features; and cause, at least in part, a classification of one or more other regions of interest based, at least in part, on the one or more classification models.

* * * * *